US012586877B2

(12) United States Patent
Nakatani et al.

(10) Patent No.:  US 12,586,877 B2
(45) Date of Patent:       Mar. 24, 2026

(54) BATTERY PACK WITH FUSIBLE LINK

(71) Applicant: MAKITA CORPORATION, Anjo (JP)

(72) Inventors: Kohei Nakatani, Anjo (JP); Junya Yamaguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 968 days.

(21) Appl. No.: 17/828,309

(22) Filed: May 31, 2022

(65) Prior Publication Data

US 2022/0416378 A1      Dec. 29, 2022

(30) Foreign Application Priority Data

Jun. 28, 2021    (JP) ................................. 2021-106902

(51) Int. Cl.
    *H01M 50/583*      (2021.01)
    *H01H 85/08*       (2006.01)
    *H01H 85/12*       (2006.01)

(52) U.S. Cl.
    CPC .......... *H01M 50/583* (2021.01); *H01H 85/08* (2013.01); *H01H 85/12* (2013.01); *H01M 2200/103* (2013.01)

(58) Field of Classification Search
    CPC .......... H01M 50/583; H01M 2200/103; H01H 85/08; H01H 85/12
    See application file for complete search history.

(56) References Cited

U.S. PATENT DOCUMENTS

| | | | |
|---|---|---|---|
| 5,420,456 | A | 5/1995 | Galbi et al. |
| 2016/0093869 | A1* | 3/2016 | Ishikawa ............. H01M 50/583 83/13 |
| 2020/0083512 | A1* | 3/2020 | Son ................... H01M 10/0585 |
| 2020/0091548 | A1 | 3/2020 | Zhang |
| 2020/0168423 | A1* | 5/2020 | Yamaguchi .............. H01H 1/58 |
| 2020/0243814 | A1* | 7/2020 | Kang ................. H01M 50/264 |

(Continued)

FOREIGN PATENT DOCUMENTS

| | | | | |
|---|---|---|---|---|
| EP | 3518319 | A1 * | 7/2019 | ............. H01H 37/76 |
| EP | 3989353 | A1 * | 4/2022 | .......... H01M 10/052 |

(Continued)

OTHER PUBLICATIONS

May 27, 2025 Office Action issued in Japanese Application No. 2021-106902.

*Primary Examiner* — Nicholas A Smith
(74) *Attorney, Agent, or Firm* — Oliff PLC

(57)           ABSTRACT

A battery pack may include a fusible link plate having a bent shape. The fusible link plate may include: a first plate part extending in a first direction; a second plate part extending in a second direction; and a bent part connecting the first plate part to the second plate part. The first plate part, the second plate part, and the bent part may be disposed along a first plane that is along both the first direction and the second direction. The first plate part may include a portion having a first cross-sectional area. The second plate part may include a portion having a second cross-sectional area. The bent part may include a first fusible part having a third cross-sectional area. The third cross-sectional area may be smaller than the first cross-sectional area and smaller than the second cross-sectional area.

8 Claims, 10 Drawing Sheets

(56) References Cited

U.S. PATENT DOCUMENTS

2021/0408641 A1      12/2021   Watahiki et al.
2023/0047348 A1 *    2/2023   Miyata ................... H01H 85/10

FOREIGN PATENT DOCUMENTS

JP          H06-140510  A        5/1994
JP          2008-300315 A       12/2008
WO          2020/026789 A1       2/2020
WO          2020/100621 A1       5/2020
WO      WO-2021060704 A1 *   4/2021   .......... H01M 10/052

* cited by examiner

LEFT

REAR

FRONT

RIGHT

DOWN

BATTERY PACK WITH FUSIBLE LINK

CROSS-REFERENCE TO RELATED APPLICATION

This application claims priority to Japanese Patent Application No. 2021-106902, filed on Jun. 28, 2021, the entire contents of which are hereby incorporated by reference into the present application.

TECHNICAL FIELD

The disclosure herewith relates to a battery pack.

BACKGROUND

Japanese Patent Application Publication No. 2008-300315 describes a battery pack for electrical equipment. The battery pack includes a battery cell, a terminal electrically connected to the electrical equipment and a fusible link plate electrically connecting the battery cell to the terminal. The fusible link plate includes a first plate part extending in a first direction. The first plate part includes a fusible part having a first cross-sectional area and a non-fusible part having a second cross-sectional area larger than the first cross-sectional area when the first plate part is viewed along the first direction. Since the first cross-sectional area of the fusible part is smaller than the second cross-sectional area of the non-fusible part, the fusible part reaches a temperature higher than the non-fusible part when overcurrent flows through the fusible link plate. Consequently, the fusible link plate melts at the fusible part.

SUMMARY

In the above battery pack, the fusible link plate has a rectangular shape extending in the first direction. Consequently, the battery pack increases in size in the first direction to accommodate the fusible link plate therein. The present disclosure discloses a technique to downsize a battery pack including a fusible link plate which blows when overcurrent flows.

A battery pack disclosed herein is used for electrical equipment. The battery pack comprises: a battery cell; a terminal configured to electrically connect to the electrical equipment; and a fusible link plate electrically connecting the battery cell to the terminal and having a bent shape. The fusible link plate comprises: a first plate part extending in a first direction; a second plate part extending in a second direction different from the first direction; and a bent part connecting the first plate part to the second plate part. The first plate part, the second plate part, and the bent part are disposed along a first plane that is along both the first direction and the second direction. The first plate part comprises a portion having a first cross-sectional area in a cross section of the first plate part along a plane perpendicular to the first direction. The second plate part comprises a portion having a second cross-sectional area in a cross section of the second plate part along a plane perpendicular to the second direction. The bent part comprises a first fusible part having a third cross-sectional area in a cross section of the bent part along a plane perpendicular to a direction along the first plane. The third cross-sectional area is smaller than the first cross-sectional area and smaller than the second cross-sectional area.

With the above configuration, by virtue of the third cross-sectional area being smaller than the first cross-sectional area and smaller than the second cross-sectional area, the first fusible part can easily reach a highest temperature when overcurrent flows through the fusible link plate. Therefore, the fusible link plate can be melted at the first fusible part within the bent part. Further, with the above configuration, by virtue of the fusible link plate having a bent shape, it is easier to dispose the fusible link plate in a space defined inside the battery pack as compared to the case in which the fusible link plate has a rectangular shape. Consequently, the battery pack can be suppressed from increasing in size in the first direction. With the above configuration, the battery pack including the fusible link plate which blows when overcurrent flows can be downsized.

BRIEF DESCRIPTION OF THE DRAWINGS

FIG. 1 illustrates a perspective view of a battery pack 10 of a first embodiment.

DETAILED DESCRIPTION

Figure 2:
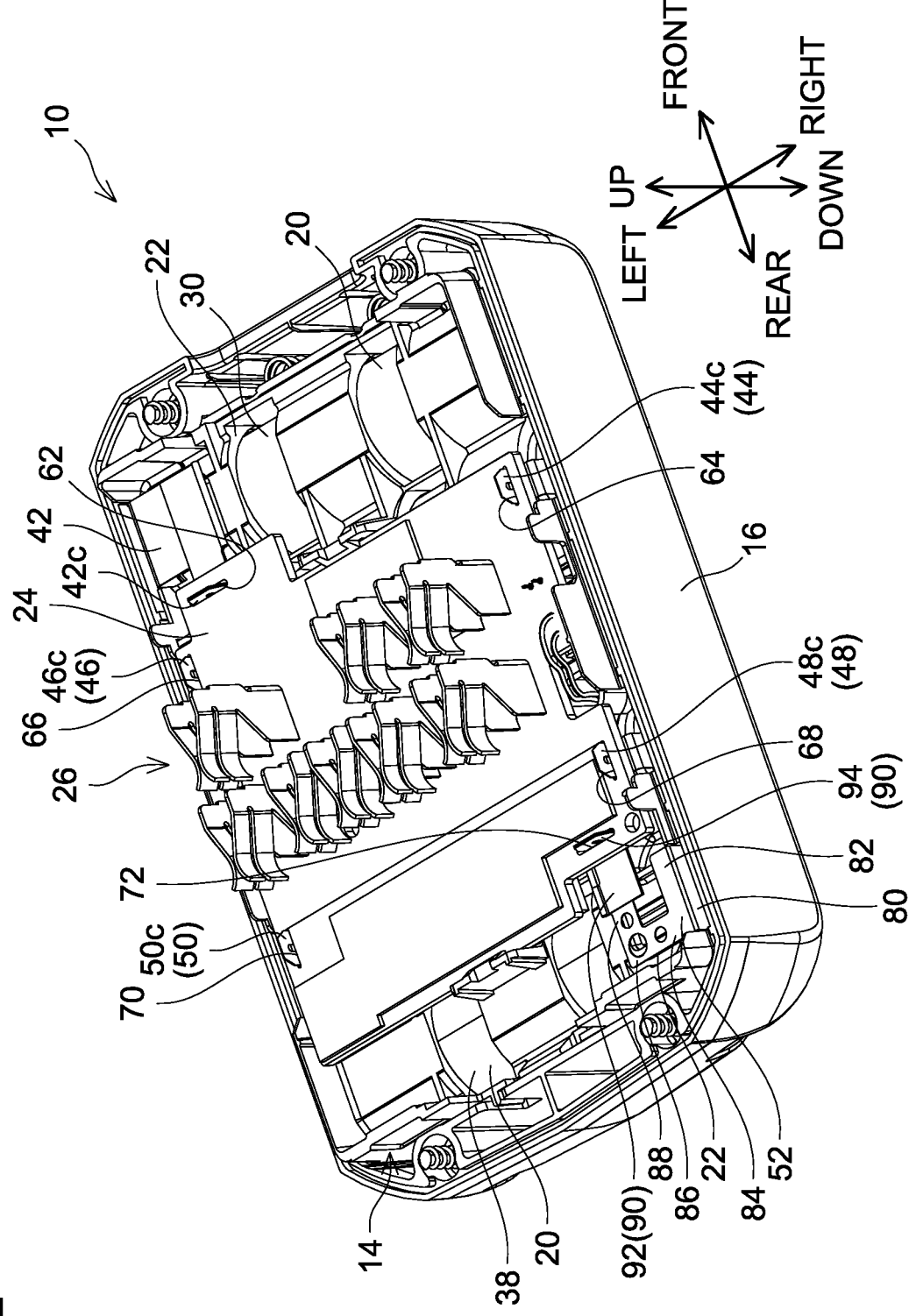
FIG. 2 illustrates a perspective view of the battery pack 10 of the first embodiment with an upper casing 18 detached.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the bent part may comprise a fuse aperture penetrating the bent part in a direction perpendicular to the first plane. The bent part may comprise: a first joint part disposed between the fuse aperture and an inner side surface of the bent part; and a second joint part disposed between the fuse aperture and an outer side surface of the bent part. With regard to a path length extending from the first plate part toward the second plate part, a path length of the first joint part may be smaller than a path length of the second joint part. The first fusible part may be disposed on the first joint part.

With the above configuration, by virtue of the path length of the first joint part being smaller than the path length of the second joint part, an electric resistance at the first joint part is smaller than an electric resistance at the second joint part. Consequently, current preferentially flows through the first joint part. With such a configuration, when the overcurrent flows through the fusible link plate, the fusible link plate can be melted at the first fusible part of the first joint part.

In one or more embodiments, the second joint part may comprise a second fusible part having a fourth cross-sectional area in the cross section of the second joint part along the plane perpendicular to the direction along the first plane. The fourth cross-sectional area may be smaller than the first cross-sectional area and smaller than the second cross-sectional area.

With the above configuration, when the fusible link plate melts at the first fusible part of the first joint part, all the current flowing through the fusible link plate flows through the second joint part. By virtue of the fourth cross-sectional area being smaller than the first cross-sectional area and smaller than the second cross-sectional area of the second thermal diffusion part 114, the second fusible part can easily reach a highest temperature when the overcurrent flows through the fusible link plate. Therefore, the fusible link plate can be melted at the second fusible part within the bent part.

In one or more embodiments, the first plate part may further comprise a portion having a fifth cross-sectional area larger than the first cross-sectional area in the cross section of the first plate part along the plane perpendicular to the first direction. The portion having the first cross-sectional area may constitute a first thermal diffusion suppressing part. The second plate part may further comprise a portion having a sixth cross-sectional area larger than the second cross-sectional area in the cross section of the second plate part along the plane perpendicular to the second direction. The portion having the second cross-sectional area may constitute a second thermal diffusion suppressing part.

With the above configuration, the first cross-sectional area is smaller than the fifth cross-sectional area. By virtue of the first thermal diffusion suppressing part being disposed at the first plate part, transmission of heat of the bent part through the first plate part can be suppressed. Further, the second cross-sectional area is smaller than the sixth cross-sectional area. By virtue of the second thermal diffusion suppressing part being disposed at the second plate part, transmission of the heat of the bent part through the second plate part can be suppressed. With such a configuration, temperature decrease at the first fusible part can be suppressed, and melting of the first fusible part can be facilitated.

In one or more embodiments, the first plate part may comprise a first thermal diffusion suppressing aperture penetrating the first plate part in the direction perpendicular to the first plane. The second plate part may comprise a second thermal diffusion suppressing aperture penetrating the second plate part in the direction perpendicular to the first plane. The first thermal diffusion suppressing part may be disposed between the first thermal diffusion suppressing aperture and a side surface of the first plate part. The second thermal diffusion suppressing part may be disposed between the second thermal diffusion suppressing aperture and a side surface of the second plate part.

With the above configuration, the first thermal diffusion suppressing part can be disposed at the first plate part with a simple configuration of having the first thermal diffusion suppressing aperture defined in the first plate part. Further, with a simple configuration of having the second thermal diffusion suppressing aperture defined in the second plate part, the second thermal diffusion suppressing part can be disposed at the second plate part.

In one or more embodiments, the fusible link plate may be electrically connected between a negative electrode of the battery cell and the terminal.

With the above configuration, the fusible link plate can be disposed in a space defined by disposing the negative electrode and the terminal of the battery cell in the battery pack. Consequently, the battery pack can be prevented from increasing in size.

First Embodiment

Figure 1:
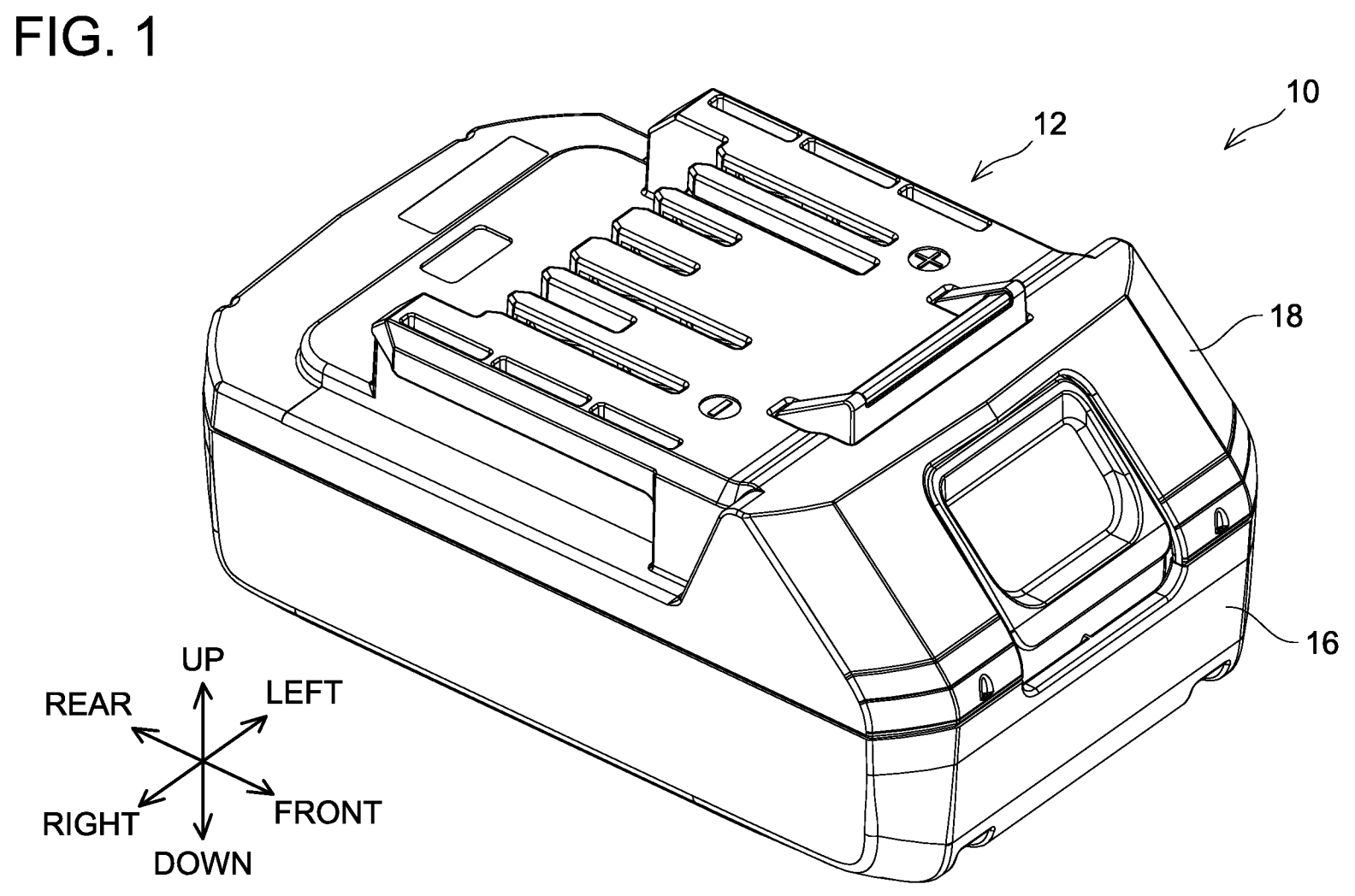

Referring to FIGS. 1 to 7, a battery pack 10 of a first embodiment will be described. The battery pack 10 illustrated in FIG. 1 is used by being attached to a battery pack attachment part (not illustrated) of electrical equipment 2 (see FIG. 5). The electrical equipment 2 may be electrical equipment configured to operate using power supplied from the battery pack 10. The electrical equipment 2 may be an electric power tool, such as a driver or a drill, which uses a motor 4 (see FIG. 5) as its prime mover, or may be an electric working machine, such as a grass mower or a blower, which uses the motor 4 (see FIG. 5) as its prime mover. Alternatively, the electrical equipment 2 may be electrical equipment, such as a light, a radio or a speaker, which does not include the motor 4. Further, the electrical equipment 2 may be a charger configured to supply power to the battery pack 10. A rated voltage of the battery pack 10 is for example 18 V. A maximum voltage of the battery pack 10 is for example 20 V. A rated capacity of the battery pack 10 is for example 2.0 Ah. Hereafter, a direction in which the battery pack 10 is slid when the battery pack 10 is to be attached to the battery pack attachment part is referred to as a rearward direction, and a direction in which the battery pack 10 is slid when the battery pack is to be detached from the battery pack attachment part is referred to as a frontward direction. With the battery pack 10 attached to the battery pack attachment part, a direction toward which the battery pack attachment part is positioned when viewed from the battery pack 10 is referred to as an upward direction, and a direction opposite to the upward direction is referred to as a downward direction. Further, a direction orthogonal to both the frontward and downward directions (front-rear direction) and the upward and downward directions (up-down direction) is referred to as a left-right direction.

The battery pack 10 comprises a casing 12 and a battery cell unit 14 (see FIG. 2) housed inside the casing 12. The casing 12 comprises a lower casing 16 and an upper casing 18. The lower casing 16 and the upper casing 18 are fastened to each other using fastener(s) (not illustrated).

As illustrated in FIG. 2, the battery cell unit 14 comprises a plurality of battery cells 20, a cell holder 22 that is constituted of resin and holds the plurality of battery cells 20, a control circuit board 24 held by the cell holder 22 by being disposed on top of the cell holder 22, and a plurality of battery-side terminals 26 disposed on an upper surface of the control circuit board 24. The plurality of battery-side terminals 26 mechanically engages with and electrically connects with equipment-side terminals (not illustrated) of the electrical equipment 2 when the battery pack 10 is attached to the battery pack attachment part of the electrical equipment 2.

Figure 3:
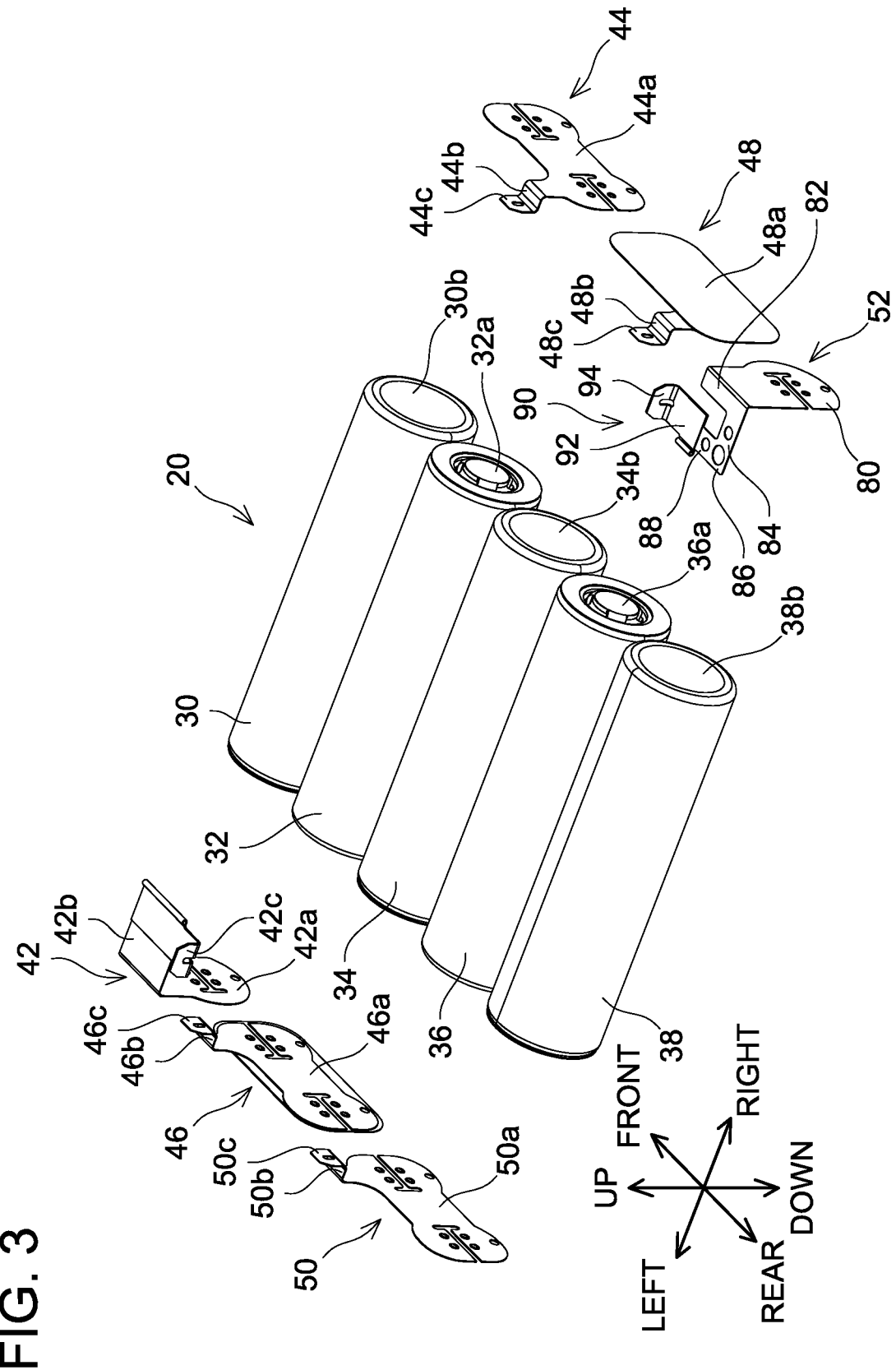
FIG. 3 illustrates an exploded perspective view of a plurality of battery cells 20, a first lead plate 42, a second lead plate 44, a third lead plate 46, a fourth lead plate 48, a fifth lead plate 50 and a fusible link plate 52 of the first embodiment.
Figure 4:
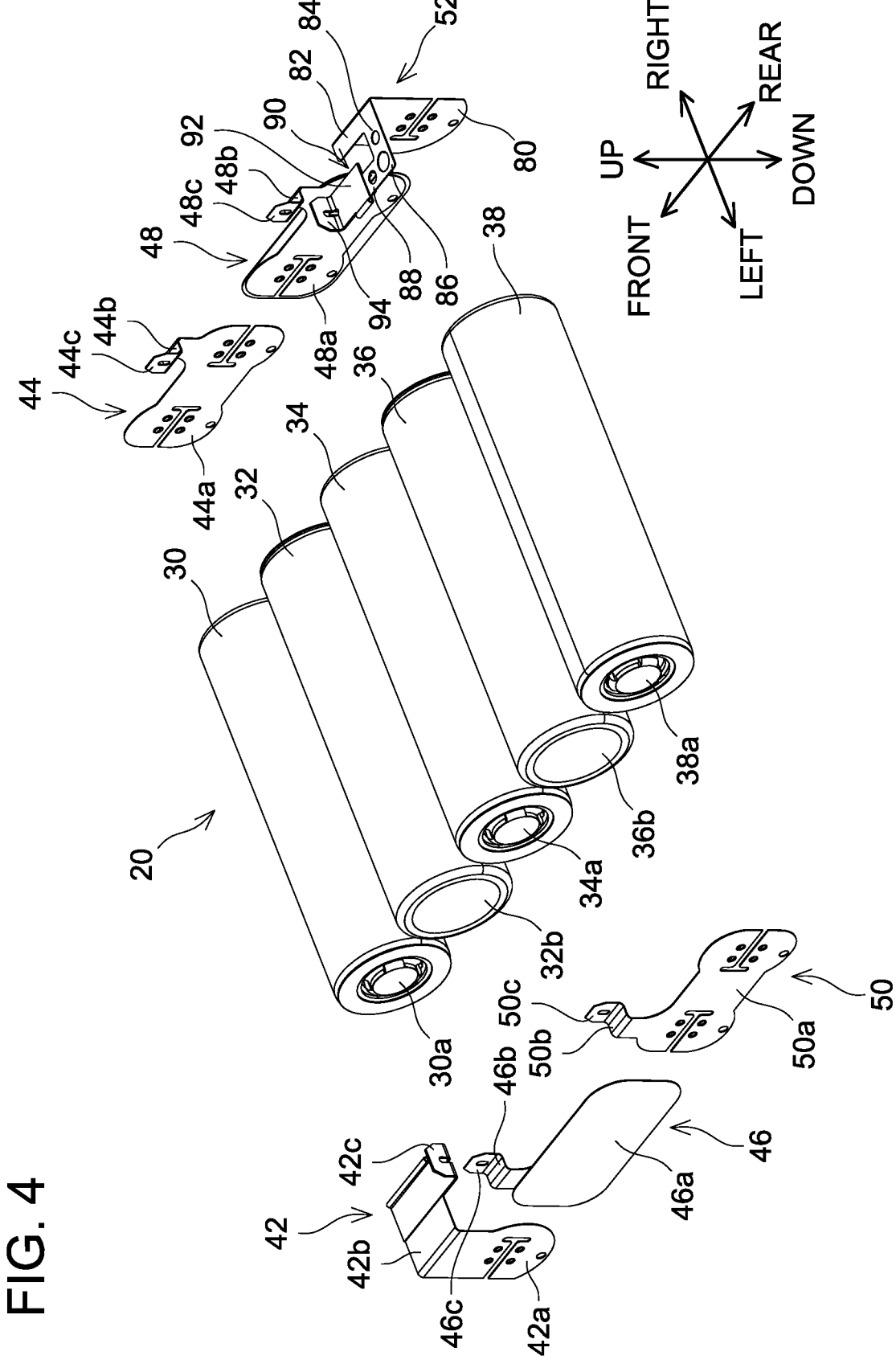
FIG. 4 illustrates an exploded perspective view of the plurality of battery cells 20, the first lead plate 42, the second lead plate 44, the third lead plate 46, the fourth lead plate 48, the fifth lead plate 50 and the fusible link plate 52 of the first embodiment.

As illustrated in FIGS. 3 and 4, each of the plurality of battery cells 20 is a rechargeable battery cell having, for example, a substantially columnar shape, and is for example a lithium-ion battery cell. Each of the plurality of battery cells 20 has a rated voltage of 2.0 Ah, a rated voltage of 3.6 V, and a maximum voltage of 4V, for example. The plurality of battery cells 20 is arranged along the front-rear direction such that a longitudinal direction of each battery cell 20 is along the left-right direction. In the present embodiment, five battery cells 20 are arranged along the front-rear direction. Hereafter, the five battery cells 20 may be referred to as, from the front, a first battery cell 30, a second battery cell 32, a third battery cell 34, a fourth battery cell 36, a fifth battery cell 38.

The battery cell unit 14 comprises a first lead plate 42, a second lead plate 44, a third lead plate 46, a fourth lead plate 48, a fifth lead plate 50, and a fusible link plate 52. The first lead plate 42, the third lead plate 46 and the fifth lead plate 50 are disposed on the left side of the plurality of battery cells 20. The second lead plate 44, the fourth lead plate 48 and the fusible link plate 52 are disposed on the right side of the plurality of battery cells 20.

The first lead plate 42 comprises a first cell connecting portion 42a, a first lead portion 42b connected to the upper end of the first cell connecting portion 42a, and a first circuit connecting portion 42c connected to the first lead portion 42b. The second lead plate 44 comprises a second cell connecting portion 44a, a second lead portion 44b connected to the upper end of the second cell connecting portion 44a, and a second circuit connecting portion 44c connected to the second lead portion 44b. The third lead plate 46 comprises a third cell connecting portion 46a, a third lead portion 46b connected to the upper end of the third cell connecting portion 46a, and a third circuit connecting portion 46c connected to the third lead portion 46b. The fourth lead plate 48 comprises a fourth cell connecting portion 48a, a fourth lead portion 48b connected to the upper end of the fourth cell connecting portion 48a, and a fourth circuit connecting portion 48c connected to the fourth lead portion 48b. The fifth lead plate 50 comprises a fifth cell connecting portion 50a, a fifth lead portion 50b connected to the upper end of the fifth cell connecting portion 50a, and a fifth circuit connecting portion 50c connected to the fifth lead portion 50b. A detailed structure of the fusible link plate 52 will be described later.

The second cell connecting portion 44a is spot-welded to a negative electrode 30b of the first battery cell 30 and a positive electrode 32a of the second battery cell 32. The fourth cell connecting portion 48a is spot-welded to a negative electrode 34b of the third battery cell 34 and a positive electrode 36a of the fourth battery cell 36. The fusible link plate 52 is spot-welded to a negative electrode 38b of the fifth battery cell 38.

As illustrated in FIG. 4, the first cell connecting portion 42a is spot-welded to a positive electrode 30a of the first battery cell 30. The third cell connecting portion 46a is spot-welded to a negative electrode 32b of the second battery cell 32 and a positive electrode 34a of the third battery cell 34. The fifth cell connecting portion 50a is spot-welded to a negative electrode 36b of the fourth battery cell 36 and a positive electrode 38a of the fifth battery cell 38.

In the battery pack 10 of the present embodiment, the fusible link plate 52, the fifth battery cell 38, the fifth lead plate 50, the fourth battery cell 36, the fourth lead plate 48, the third battery cell 34, the third lead plate 46, the second battery cell 32, the second lead plate 44, the first battery cell 30 and the first lead plate 42 are electrically connected in series in this order.

As illustrated in FIG. 2, the first circuit connecting portion 42c is inserted into a positive power source aperture 62 defined in the control circuit board 24. The second circuit connecting portion 44c is inserted into a cell voltage detection aperture 64 defined in the control circuit board 24. The third circuit connecting portion 46c is inserted into a cell voltage detection aperture 66 defined in the control circuit board 24. The fourth circuit connecting portion 48c is inserted into a cell voltage detection aperture 68 defined in the control circuit board 24. The fifth circuit connecting portion 50c is inserted into a cell voltage detection aperture 70 defined in the control circuit board 24. The fusible link plate 52 is inserted into a negative power source aperture 72 defined in the control circuit board 24.

Figure 5:
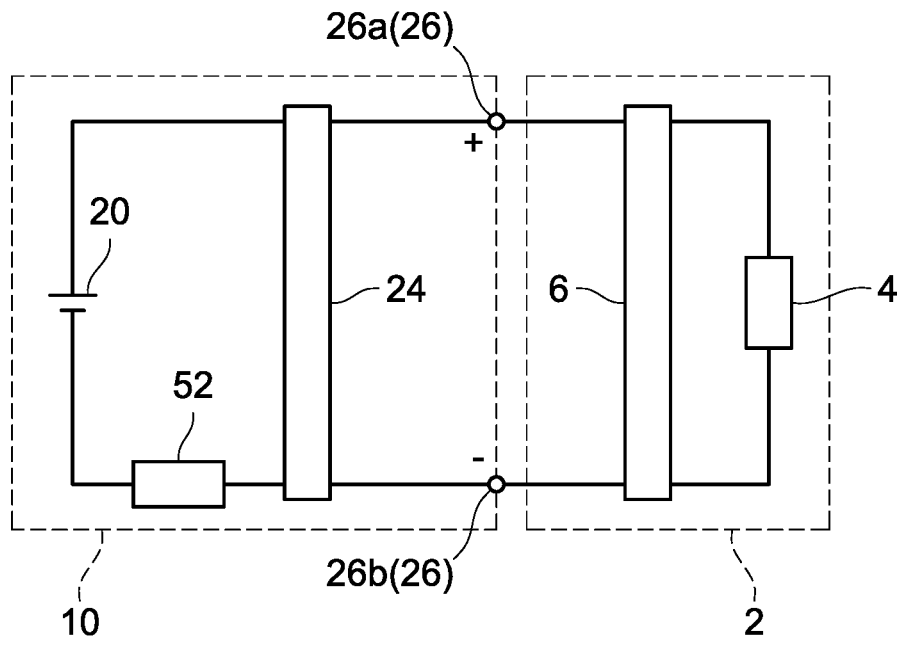
FIG. 5 illustrates a block diagram of the battery pack 10 and electrical equipment 2 of the first embodiment.

Next, referring to FIG. 5, a block diagram of the battery pack 10 will be described. The positive electrodes of the battery cells 20 electrically connect to battery-side positive terminals 26a of the battery-side terminals 26 via the control circuit board 24. The negative electrodes of the battery cells 20 electrically connect to battery-side negative terminals 26b of the battery-side terminals 26 via the fusible link plate 52 and the control circuit board 24. The control circuit board 24 is configured to control discharge of power from the battery cells 20 to the battery-side positive terminals 26a and the battery-side negative terminals 26b and discharge of power from the battery-side positive terminals 26a and the battery-side negative terminals 26b to the battery cells 20. When the battery pack 10 is attached to the electrical equipment 2, each of the battery-side positive terminals 26a and the battery-side negative terminals 26b electrically connects to the motor 4 via the control circuit board 6 of the electrical equipment 2. The control circuit board 6 drives the motor 4 by controlling the discharge of power from the battery-side positive terminals 26a and the battery-side negative terminals 26b to the motor 4. When the electrical equipment 2 is a charger including a power circuit (not illustrated) instead of the motor 4, each of the battery-side positive terminals 26a and the battery-side negative terminals 26b electrically connects to the power circuit via the control circuit board 6 of the electrical equipment 2. In this case, the control circuit board 6 charges the battery cells 20 by controlling the discharge of power from the power circuit to the battery-side positive terminals 26a and the battery-side negative terminals 26b.

Figure 6:
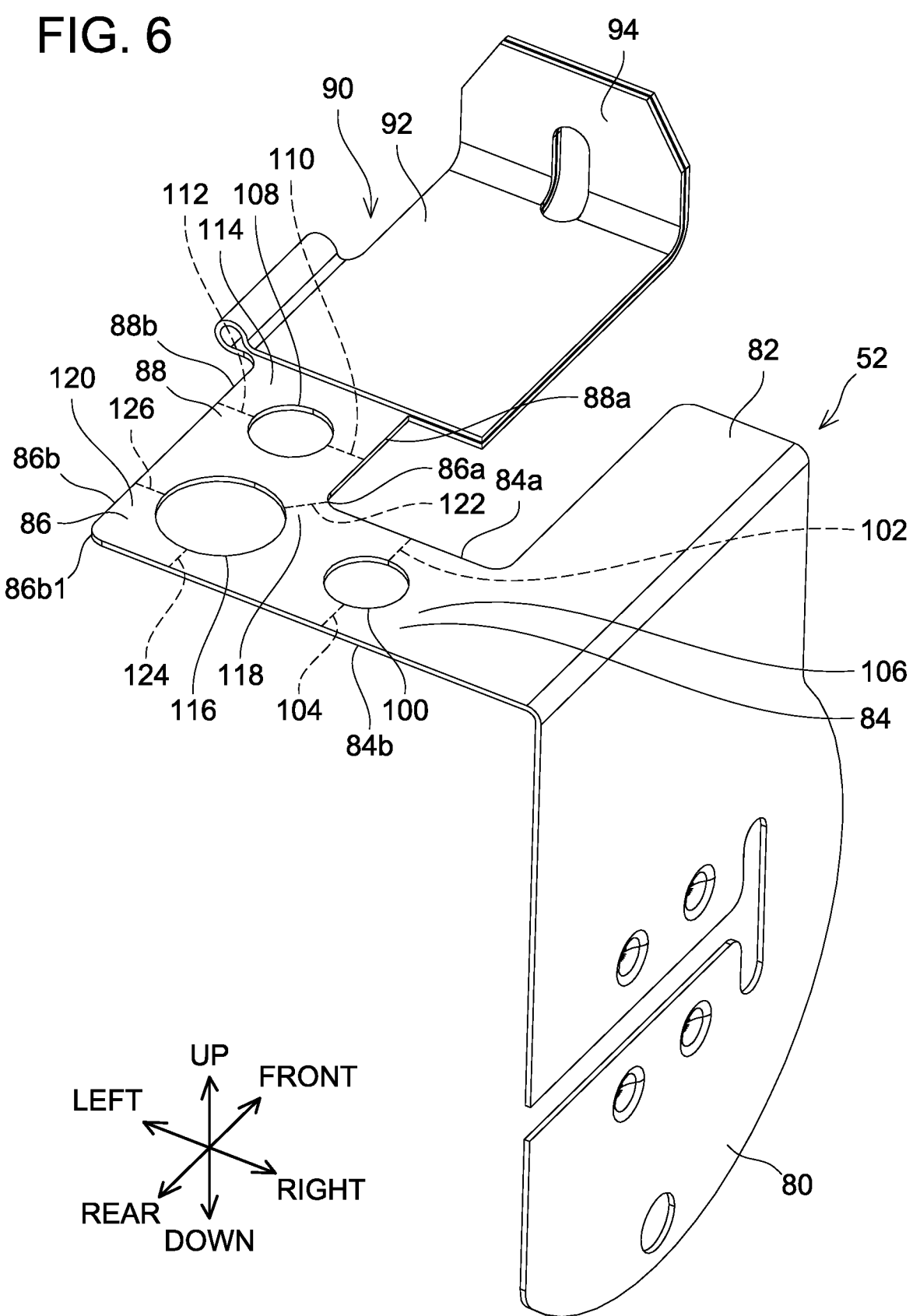
FIG. 6 illustrates a perspective view of the fusible link plate 52 of the first embodiment.

Next, referring to FIG. 6 and FIG. 7, the fusible link plate 52 will be described. The fusible link plate 52 is manufactured by bending a single plate having an even thickness. In a variant, the thickness of the plate may be uneven.

The fusible link plate 52 comprises a cell connecting part 80, a lead part 82, a first plate part 84, a bent part 86, a second plate part 88 and a hemming fold part 90. As illustrated in FIG. 3, the cell connecting part 80 is spot-welded to the negative electrode 38b of the fifth battery cell 38. The cell connecting part 80 extends in the up-down direction. As illustrated in FIG. 6, the lead part 82 extends leftward from the upper end of the cell connecting part 80. The lead part 82 is arranged along a plane perpendicular to the up-down direction (which may hereafter be referred to as a first plane).

The first plate part 84 extends leftward from a rear portion of the left end of the lead part 82. When the first plate part 84 is viewed in the up-down direction, the first plate part 84 has a substantially rectangular shape having its longitudinal direction in the left-right direction. A width of the first plate part 84 in the front-rear direction is constant along the left-right direction. The width of the first plate part 84 in the front-rear direction is smaller than a width of the lead part 82 in the front-rear direction. The first plate part 84 is arranged along the first plane.

The bent part 86 connects the first plate part 84 with the second plate part 88. The bent part 86 extends from the left end of the first plate part 84 such that it bends frontward. The bent part 86 is arranged along the first plane.

The second plate part 88 extends frontward from the front end of the bent part 86. The direction in which the second plate part 88 extends is perpendicular to the direction in which the first plate part 84 extends. When the second plate part 88 is viewed in the up-down direction, the second plate part 88 has a substantially rectangular shape having its longitudinal direction in the front-rear direction. When the fusible link plate 52 is viewed in the up-down direction, the entire shape formed by the first plate part 84, the bent part 86 and the second plate part 88 has a bent shape, and has substantially a L-shape in the present embodiment. A width of the second plate part 88 in the left-right direction is constant along the front-rear direction. The width of the second plate part 88 in the left-right direction is substantially equal to a width of the first plate part 84 in the front-rear direction. The second plate part 88 is arranged along the first plane.

The hemming fold part 90 is connected to the front end of the second plate part 88. The hemming fold part 90 is formed by folding one plate such that the folded parts overlap each other. A thickness of the hemming fold part 90 (width in the up-down direction) is approximately two times larger than each of a thickness of the cell connecting part 80 (width in the left-right direction), a thickness of the lead part 82 (width in the up-down direction), a thickness of the first plate part 84 (width in the up-down direction), a thickness of the bent part 86 (width in the up-down direction) and a thickness of the second plate part 88 (width in the up-down direction). A cross-sectional area of the hemming fold part 90 is larger as compared to the case in which the hemming fold part 90 has a thickness corresponding to a thickness of one plate. This suppresses temperature increase in the hemming fold part 90 when current flows through the hemming fold part 90.

The hemming fold part 90 comprises a first hemming bent part 92 and a second hemming fold part 94. The first hemming bent part 92 extends frontward from the front end of the second plate part 88. The first hemming bent part 92 is arranged along the first plane. A width of the first hemming bent part 92 in the left-right direction is larger than the width of the second plate part 88 in the left-right direction. The second hemming fold part 94 extends upward from the front end of the first hemming bent part 92. A width of the second hemming fold part 94 in the left-right direction is larger than the width of the second plate part 88 in the left-right direction.

As illustrated in FIG. 2, with the fusible link plate 52 attached to the fifth battery cell 38 and the control circuit board 24, the cell connecting part 80 is disposed in a minute space provided between the negative electrode 38b of the fifth battery cell 38 and the inner surface of the lower casing 16. The cell holder 22 is disposed above the fifth battery cell 38. The lead part 82, the first plate part 84, the bent part 86 and the second plate part 88 are disposed above the cell holder 22 and below the control circuit board 24. With respect to the up-down direction, the lead part 82, the first plate part 84, the bent part 86, the second plate part 88 are disposed in the minute space above the cell holder 22. None of the lead part 82, the first plate part 84, the bent part 86 and the second plate part 88 is in direct contact with the fifth battery cell 38 due to the presence of the cell holder 22 therebetween. The first hemming bent part 92 extends from the second plate part 88 toward a space between the cell holder 22 and the control circuit board 24, and the front end of the first hemming bent part 92 and its vicinity is disposed between the cell holder 22 and the control circuit board 24. The first hemming bent part 92 is disposed in a minute space above the cell holder 22 and a minute space provided between the cell holder 22 and the control circuit board 24. The second hemming fold part 94 is inserted upward into the negative power source aperture 72 defined in the control circuit board 24 from below. As described above, the fusible link plate 52 is disposed in the minute space in the battery pack 10.

Figure 7:
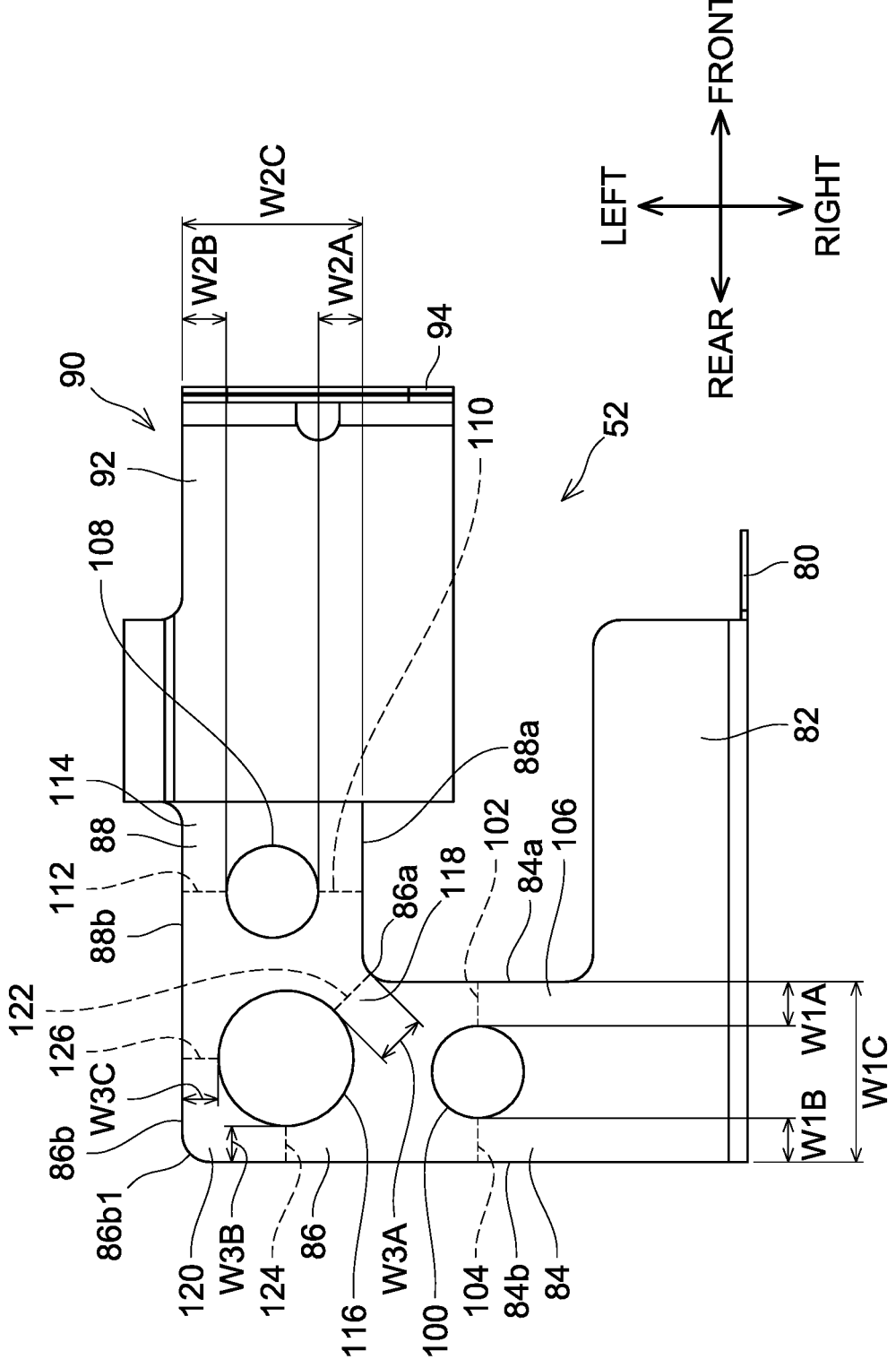
FIG. 7 illustrates a top view of the fusible link plate 52 of the first embodiment.

As illustrated in FIG. 7, the first plate part 84 includes a first thermal diffusion suppressing aperture 100. The first thermal diffusion suppressing aperture 100 penetrates the first plate part 84 in the up-down direction. When the fusible link plate 52 is viewed in the up-down direction, the first thermal diffusion suppressing aperture 100 has a perfect circle shape. The first thermal diffusion suppressing aperture 100 is disposed at a position that equally spaces the same from a front side surface 84a and from a rear side surface 84b of the first plate part 84. Hereafter, a part where a distance between the first thermal diffusion suppressing aperture 100 and the front side surface 84a is minimum is referred to as a first thermal diffusion suppressing part 102, and a part where a distance between the first thermal diffusion suppressing aperture 100 and the rear side surface 84b is minimum is referred to as a first thermal diffusion suppressing part 104. In FIG. 7, each of the first thermal diffusion suppressing parts 102, 104 is illustrated by a broken line. With respect to the left-right direction, a portion of the first plate part 84 where the first thermal diffusion suppressing aperture 100 is not defined is referred to as a first thermal diffusion part 106. A width W1A of the first thermal diffusion suppressing part 102 in the front-rear direction is substantially equal to a width W1B of the first thermal diffusion suppressing part 104 in the front-rear direction, and smaller than a width W1C of the first thermal diffusion part 106 in the front-rear direction. The width W1C of the first thermal diffusion part 106 in the front-rear direction corresponds to the width of the first plate part 84 in the front-rear direction. A thickness of the first thermal diffusion suppressing part 102 (i.e., width in the up-down direction) is substantially equal to a thickness of the first thermal diffusion suppressing part 104 (i.e., width in the up-down direction), and is substantially equal to a thickness of the first thermal diffusion part 106 (i.e., width in the up-down direction). Consequently, in a cross section of the first thermal diffusion suppressing parts 102, 104 and the first thermal diffusion part 106 along a plane perpendicular to the left-right direction, a cross-sectional area of the first thermal diffusion suppressing part 102 is substantially equal to a cross-sectional area of the first thermal diffusion suppressing part 104 and is smaller than a cross-sectional area of the first thermal diffusion part 106.

The second plate part 88 includes a second thermal diffusion suppressing aperture 108. The second thermal diffusion suppressing aperture 108 penetrates the second plate part 88 in the up-down direction. When the fusible link plate 52 is viewed in the up-down direction, the second thermal diffusion suppressing aperture 108 has a perfect circle shape. The second thermal diffusion suppressing aperture 108 is disposed at a position that equally spaces the same from a right side surface 88a and a left side surface 88b of the second plate part 88. When the fusible link plate 52 is viewed in the up-down direction, a diameter of the second thermal diffusion suppressing aperture 108 is substantially equal to a diameter of the first thermal diffusion suppressing aperture 100. Hereafter, a part where a distance between the second thermal diffusion suppressing aperture 108 and the right side surface 88a is minimum is referred to as a second thermal diffusion suppressing part 110, and a part where a distance between the second thermal diffusion suppressing aperture 108 and the left side surface 88b is minimum is referred to as a second thermal diffusion suppressing part 112. In FIG. 7, each of the second thermal diffusion suppressing parts 110, 112 is illustrated in a broken line. In the front-rear direction, a part of the second plate part 88 where the second thermal diffusion suppressing aperture 108 is not defined is referred to as a second thermal diffusion part 114. A width W2A of the second thermal diffusion suppressing part 110 in the left-right direction is substantially equal to a width W2B of the second thermal diffusion suppressing part 112 in the left-right direction, and smaller than a width W2C of the second thermal diffusion part 114 in the left-right direction. The width W2C of the second thermal diffusion part 114 in the left-right direction corresponds to the width of the second plate part 88 in the left-right direction. The width W2A of the second thermal diffusion suppressing part 110 in the left-right direction is substantially equal to the width W1A of the first thermal diffusion suppressing part 102 in the front-rear direction. A thickness of the second thermal diffusion suppressing part 110 (i.e., width in the up-down direction) is substantially equal to a thickness of the second thermal diffusion suppressing part 112 (i.e., width in the up-down direction), and is substantially equal to a thickness of the second thermal diffusion part 114 (i.e., width in the up-down direction). The thickness of the second thermal diffusion suppressing part 110 is substantially equal to the thickness of the first thermal diffusion suppressing part 102. Consequently, in a cross section of the second thermal diffusion suppressing parts 110, 112 and the second thermal diffusion part 114 along a plane perpendicular to the front-rear direction, a cross-sectional area of the second thermal diffusion suppressing part 110 is substantially equal to a cross-sectional area of the second thermal diffusion suppressing part 112 and is smaller than a cross-sectional area of the second thermal diffusion part 114. The cross-sectional area of the second thermal diffusion suppressing part 110 is substantially equal to the cross-sectional area of the first thermal diffusion suppressing part 102. The cross-sectional area of the second thermal diffusion part 114 is substantially equal to the cross-sectional area of the first thermal diffusion part 106.

The bent part 86 includes a fuse aperture 116. The fuse aperture 116 penetrates the bent part 86 in the up-down direction. When the fusible link plate 52 is viewed in the up-down direction, the fuse aperture 116 has a perfect circle shape. A diameter of the fuse aperture 116 is larger than the diameter of the first thermal diffusion suppressing aperture 100 and larger than the diameter of the second thermal diffusion suppressing aperture 108. A width between the fuse aperture 116 and the first thermal diffusion suppressing aperture 100 in the left-right direction is substantially equal to a width between the fuse aperture 116 and the second thermal diffusion suppressing aperture 108 in the front-rear direction. The bent part 86 comprises a first joint part 118 disposed between an inner side surface 86a of the bent part 86 and the fuse aperture 116 and a second joint part 120 disposed between the outer side surface 86b of the bent part 86 and the fuse aperture 116. The inner side surface 86a connects the front side surface 84a of the first plate part 84 with the right side surface 88a of the second plate part 88, and the outer side surface 86b connects the rear side surface 84b of the first plate part 84 with the left side surface 88b of the second plate part 88. With regard to a path length extending from the first plate part 84 toward the second plate part 88 along the bent part 86, a path length of the first joint part 118 is smaller than a path length of the second joint part 120.

The first joint part 118 includes a part where a distance between the inner side surface 86a and the fuse aperture 116 is minimum. Hereafter, the part where the distance between the inner side surface 86a and the fuse aperture 116 is minimum is referred to as a first fusible part 122. The second joint part 120 includes two parts where a distance between the outer side surface 86b and the fuse aperture 116 is minimum. Hereafter, among the parts where the distance between the outer side surface 86b and the fuse aperture 116 is minimum, a part disposed proximate to the first plate part 84 with respect to the left-right direction is referred to as a second fusible part 124, and a part disposed proximate to the second plate part 88 with respect to the front-rear direction is referred to as a second fusible part 126. In FIG. 7, each of the first fusible part 122 and the second fusible parts 124, 126 is illustrated by a broken line.

A width W3A of the first fusible part 122 (i.e., the minimum width between the inner side surface 86a and the fuse aperture 116) is larger than a width W3B of the second fusible part 124 (i.e., the minimum width between the outer side surface 86b and the fuse aperture 116), and is larger than a width W3C of the second fusible part 126 (i.e., the minimum width between the outer side surface 86b and the fuse aperture 116). The width W3B of the second fusible part 124 is substantially equal to the width W3C of the second fusible part 126. The thickness of the first fusible part 122 (i.e., a width in the up-down direction) is substantially equal to the thickness of the second fusible part 124 (i.e., width in the up-down direction) and substantially equal to the thickness of the second fusible part 126 (i.e., the width in the up-down direction). The thickness of the first fusible part 122 is substantially equal to the thickness of the first thermal diffusion suppressing part 102 and is substantially equal to the thickness of the second thermal diffusion suppressing part 110. Therefore, in a cross section of the first fusible part 122 and the second fusible parts 124, 126 along a plane perpendicular to the first plane, the cross-sectional area of the first fusible part 122 is larger than a cross-sectional area of the second fusible part 124 and larger than a cross-sectional area of the second fusible part 126. The cross-sectional area of the second fusible part 124 is substantially equal to the cross-sectional area of the second fusible part 126. The cross-sectional area of the first fusible part 122 is smaller than the cross-sectional area of the first thermal diffusion suppressing part 102 and is smaller than the cross-sectional area of the second thermal diffusion suppressing part 110.

A width between the fuse aperture 116 and the first thermal diffusion suppressing aperture 100 in the left-right direction is smaller than a width WIC of the first thermal diffusion part 106 in the front-rear direction. A width between the fuse aperture 116 and the second thermal diffusion suppressing aperture 108 in the front-rear direction is smaller than the width W2C of the second thermal diffusion part 114 in the left-right direction.

Next, a phenomenon in which the fusible link plate 52 blows when overcurrent flows through the fusible link plate 52 will be described. In the fusible link plate 52, current flows through the hemming fold part 90, the second plate part 88, the bent part 86, the first plate part 84, the lead part 82, and the cell connecting part 80 in this order. With respect to a path length along which the current flows through the bent part 86, since the path length of the first joint part 118 is smaller than the path length of the second joint part 120, the current preferentially flows through the first joint part 118. The cross-sectional area of the first fusible part 122 is smaller than each of the cross-sectional area of the first thermal diffusion suppressing part 102, the cross-sectional area of the first thermal diffusion suppressing part 104, the cross-sectional area of the second thermal diffusion suppressing part 110, and the cross-sectional area of the second thermal diffusion suppressing part 112. Therefore, when the overcurrent flows thorough the fusible link plate 52, the first fusible part 122 reaches a highest temperature. Further, by virtue of the presence of the first thermal diffusion suppressing parts 102, 104 and the second thermal diffusion suppressing parts 110, 112, transmission of heat of the first fusible part 122 through the first plate part 84 and the second plate part 88 can be suppressed. Therefore, the first fusible part 122 easily reaches a high temperature, thus the fusible link plate 52 melts at the first fusible part 122.

When the fusible link plate 52 melts at the first fusible part 122, all the current flowing through the fusible link plate 52 flows through the second joint part 120 within the bent part 86. Each of the cross-sectional areas of the second fusible parts 124, 126 is smaller than each of the cross-sectional area of the first thermal diffusion suppressing part 102, the cross-sectional area of the first thermal diffusion suppressing part 104, the cross-sectional area of the second thermal diffusion suppressing part 110, and the cross-sectional area of the second thermal diffusion suppressing part 112, by which the second fusible parts 124, 126 reach highest temperatures. Further, by virtue of the presence of the first thermal diffusion suppressing parts 102, 104 and the second thermal diffusion suppressing parts 110, 112, transmission of heat of the second fusible parts 124, 126 through the first plate part 84 and the second plate part 88 can be suppressed. Consequently, the second fusible parts 124, 126 reach high temperatures, thus the fusible link plate 52 melts at least at one of the second fusible parts 124, 126. Therefore, the current cannot flow through the fusible link plate 52 from the hemming fold part 90 to the cell connecting part 80.

(Effect)

In the present embodiment, the battery pack 10 is used for the electrical equipment 2. The battery pack 10 comprises:

the battery cells 20; the battery-side terminals 26 configured to electrically connect to the electrical equipment 2; and the fusible link plate 52 electrically connecting the battery cells 20 to the battery-side terminals 26 and having a bent shape. The fusible link plate 52 comprises: the first plate part 84 extending in the left-right direction; the second plate part 88 extending in the front-rear direction different from the left-right direction; and the bent part 86 connecting the first plate part 84 to the second plate part 88. The first plate part 84, the second plate part 88, and the bent part 86 are disposed along the first plane that is along both the left-right direction and the front-rear direction. The first plate part 84 comprises first thermal diffusion suppressing parts 102, 104 having the specific cross-sectional areas in the cross section of the first plate part 84 along the plane perpendicular to the left-right direction. The second plate part 88 comprises the second thermal diffusion suppressing parts 110, 112 having the specific cross-sectional areas in the cross section of the second plate part 88 along the plane perpendicular to the front-rear direction. The bent part 86 comprises the first fusible part 122 having the specific cross-sectional area in the cross section of the bent part 86 along the plane perpendicular to the direction along the first plane. The cross-sectional area of the first fusible part 122 is smaller than each of the cross-sectional areas of the first thermal diffusion suppressing parts 102, 104 and smaller than each of the cross-sectional areas of the second thermal diffusion suppressing parts 110, 112.

With the above configuration, by virtue of the cross-sectional area of the first fusible part 122 being smaller than each of the cross-sectional areas of the first thermal diffusion suppressing parts 102, 104 and smaller than each of the cross-sectional areas of the second thermal diffusion suppressing parts 110, 112, the first fusible part 122 tends to reach the highest temperature when the overcurrent flows through the fusible link plate 52. Therefore, the fusible link plate 52 can be melted at the first fusible part 122 within the bent part 86. Further, with the above configuration, by virtue of the fusible link plate 52 having the bent shape, it is easier to dispose the fusible link plate 52 in a space defined inside the battery pack 10 as compared to the case in which the fusible link plate 52 has a rectangular shape. Consequently, the battery pack can be suppressed from increasing in size in a first direction (e.g., the front-rear direction). With the above configuration, the battery pack 10 including the fusible link plate 52 which blows when the overcurrent flows can be downsized.

The bent part 86 comprises the fuse aperture 116 penetrating the bent part 86 in the direction perpendicular to the first plane. The bent part 86 comprises: the first joint part 118 disposed between the fuse aperture 116 and the inner side surface 86a of the bent part 86; and the second joint part 120 disposed between the fuse aperture 116 and the outer side surface 86b of the bent part 86. With regard to the path length extending from the first plate part 84 toward the second plate part 88, the path length of the first joint part 118 is smaller than the path length of the second joint part 120. The first fusible part 122 is disposed on the first joint part 118.

With the above configuration, by virtue of the path length of the first joint part 118 being smaller than the path length of the second joint part 120, an electric resistance at the first joint part 118 is smaller than an electric resistance at the second joint part 120. Consequently, the current preferentially flows through the first joint part 118. With such a configuration, when the overcurrent flows through the fusible link plate 52, the fusible link plate 52 can be melted at the first fusible part 122 of the first joint part 118.

The second joint part 120 comprises the second fusible parts 124, 126 having the specific cross-sectional areas in the cross section of the second joint part 120 along the plane perpendicular to the direction along the first plane. Each of the cross-sectional areas of the second fusible parts 124, 126 is smaller than the cross-sectional area of the first thermal diffusion part 106 and smaller than the cross-sectional area of the second thermal diffusion part 114.

With the above configuration, when the fusible link plate 52 melts at the first fusible part 122 of the first joint part 118, all the current flowing through the fusible link plate 52 flows through the second joint part 120. By virtue of each of the cross-sectional areas of the second fusible parts 124, 126 being smaller than the cross-sectional area of the first thermal diffusion part 106 and smaller than the cross-sectional area of the second thermal diffusion part 114, the second fusible parts 124, 126 can easily reach the highest temperatures when the overcurrent flows through the fusible link plate 52. Therefore, the fusible link plate 52 can be melted at least at one of the second fusible parts 124, 126 within the bent part 86.

The first plate part 84 further comprises the first thermal diffusion part 106 having the specific cross-sectional area larger than each of the cross-sectional areas of the first thermal diffusion suppressing parts 102, 104 in the cross section of the first plate part 84 along the plane perpendicular to the left-right direction. The second plate part 88 further comprises the second thermal diffusion part 114 having the specific cross-sectional area larger than each of the cross-sectional areas of the second thermal diffusion suppressing parts 110, 112 in the cross section of the second plate part 88 along the plane perpendicular to the front-rear direction.

With the above configuration, each of the cross-sectional areas of the first thermal diffusion suppressing parts 102, 104 is smaller than the cross-sectional area of the first thermal diffusion part 106. By virtue of the first thermal diffusion suppressing parts 102, 104 being disposed at the first plate part 84, transmission of the heat of the bent part 86 through the first plate part 84 can be suppressed. Further, each of the cross-sectional areas of the second thermal diffusion suppressing parts 110, 112 is smaller than the cross-sectional area of the second thermal diffusion part 114. By virtue of the second thermal diffusion suppressing parts 110, 112 being disposed at the second plate part 88, transmission of the heat of the bent part 86 through the second plate part 88 can be suppressed. With such a configuration, temperature decrease at the first fusible part 122 can be suppressed, and melting of at the first fusible part 122 can be facilitated.

The first plate part 84 comprises the first thermal diffusion suppressing aperture 100 penetrating the first plate part 84 in the direction perpendicular to the first plane. The second plate part 88 comprises the second thermal diffusion suppressing aperture 108 penetrating the second plate part 88 in the direction perpendicular to the first plane. The first thermal diffusion suppressing parts 102, 104 are disposed between the first thermal diffusion suppressing aperture 100 and the side surfaces 84a, 84b of the first plate part 84. The second thermal diffusion suppressing parts 110, 112 are disposed between the second thermal diffusion suppressing aperture 108 and the side surfaces 88a, 88b of the second plate part 88.

With the above configuration, the first thermal diffusion suppressing parts 102, 104 can be disposed at the first plate part 84 with a simple configuration of having the first thermal diffusion suppressing aperture 100 defined in the first plate part 84. Further, with a simple configuration of having the second thermal diffusion suppressing aperture 108 defined in the second plate part 88, the second thermal diffusion suppressing parts 110, 112 can be disposed at the second plate part 88.

The fusible link plate 52 is electrically connected between the negative electrode of the battery cell 20 and the battery-side terminal 26.

With the above configuration, the fusible link plate 52 can be disposed in the space defined by disposing the negative electrodes and the battery-side terminals 26 of the battery cells in the battery pack 10. Consequently, the battery pack 10 can be suppressed from increasing in size.

(Corresponding Relationships)

The battery-side terminals 26 are examples of "terminal". The left-right direction is an example of "first direction". The front-rear direction is an example of "second direction". The cross-sectional areas of the first thermal diffusion suppressing parts 102, 104 are examples of "first cross-sectional area". The cross-sectional areas of the second thermal diffusion suppressing parts 110, 112 are examples of "second cross-sectional area". The cross-sectional area of the first fusible part 122 is an example of "third cross-sectional area". The cross-sectional areas of the second fusible parts 124, 126 are examples of "fourth cross-sectional area". The cross-sectional area of the first thermal diffusion part 106 is an example of "fifth cross-sectional area". The cross-sectional area of the second thermal diffusion part 114 is an example of "sixth cross-sectional area".

Second Embodiment

Figure 8:
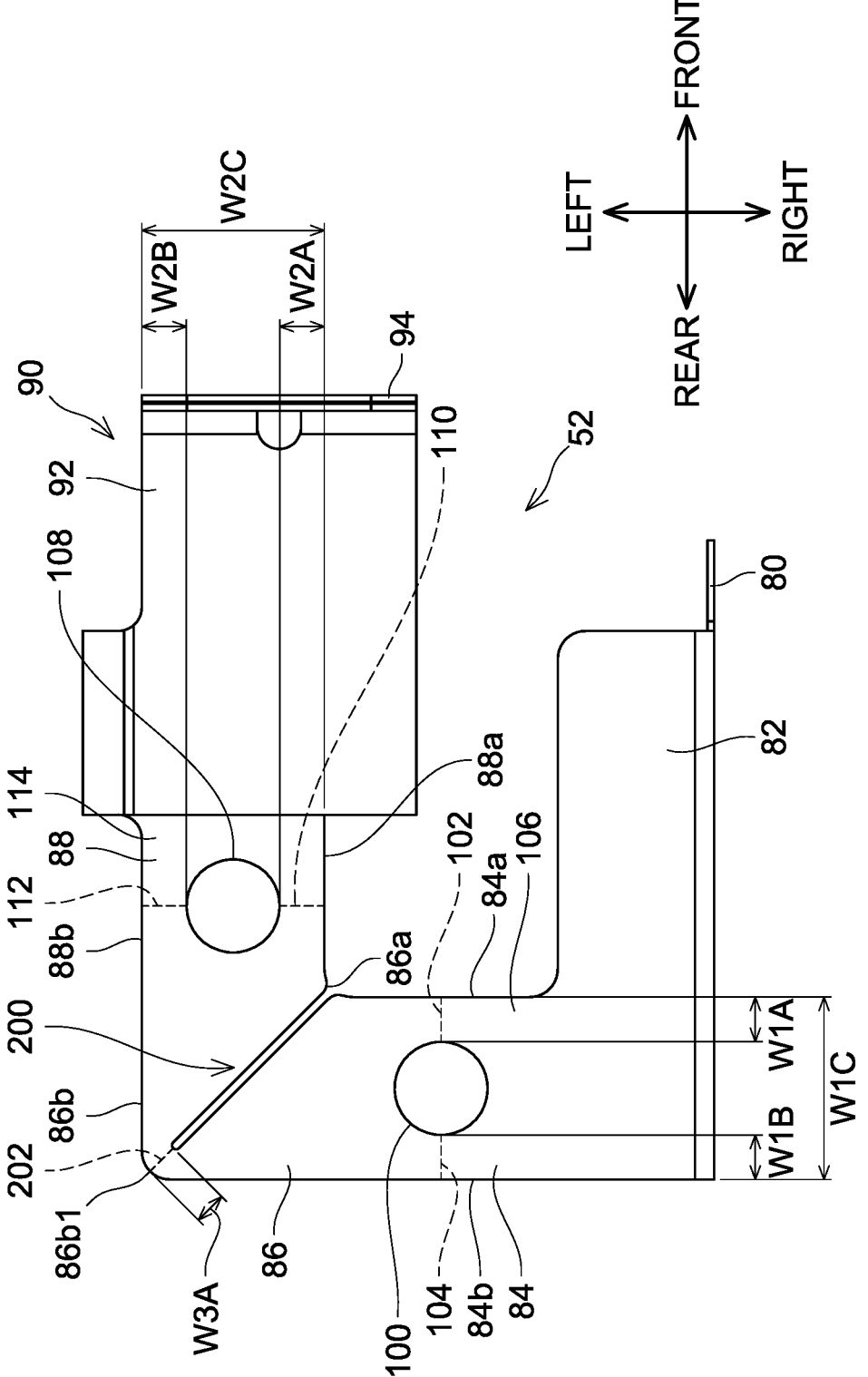
FIG. 8 illustrates a top view of the fusible link plate 52 of a second embodiment.

Referring to FIG. 8, a second embodiment will be described. In the second embodiment, points different from the first embodiment will only be described, and the same points as the first embodiment are given the same reference signs and explanations thereof will be omitted. In the second embodiment, a cutout 200 is defined in the bent part 86 instead of the fuse aperture 116 of the first embodiment. The cutout 200 is cut out from the inner side surface 86a toward the outer side surface 86b. A first fusible part 202 is disposed between a position of the cutout 200 furthest away from the inner side surface 86a and a bending position 86b1 of the outer side surface 86b. A width W3A of the first fusible part 202 is smaller than the width WI A of the first thermal diffusion suppressing part 102 of the first plate part 84 in the front-rear direction and smaller than the width W2A of the second thermal diffusion suppressing part 110 of the second plate part 88 in the left-right direction. Further, a thickness of the first fusible part 202 (i.e., width in the up-down direction) is substantially equal to the thickness of the first thermal diffusion suppressing part 102 and substantially equal to the second thermal diffusion suppressing part 110. Therefore, in a cross section of the first fusible part 202 along a plane perpendicular to the first plane, a cross-sectional area of the first fusible part 202 is smaller than the cross-sectional area of the first thermal diffusion suppressing part 102 and is smaller than the cross-sectional area of the second thermal diffusion suppressing part 110. When overcurrent flows through the fusible link plate 52, the first fusible part 202 reaches the highest temperature, thus the fusible link plate 52 melts at the first fusible part 202.

Third Embodiment

Figure 9:
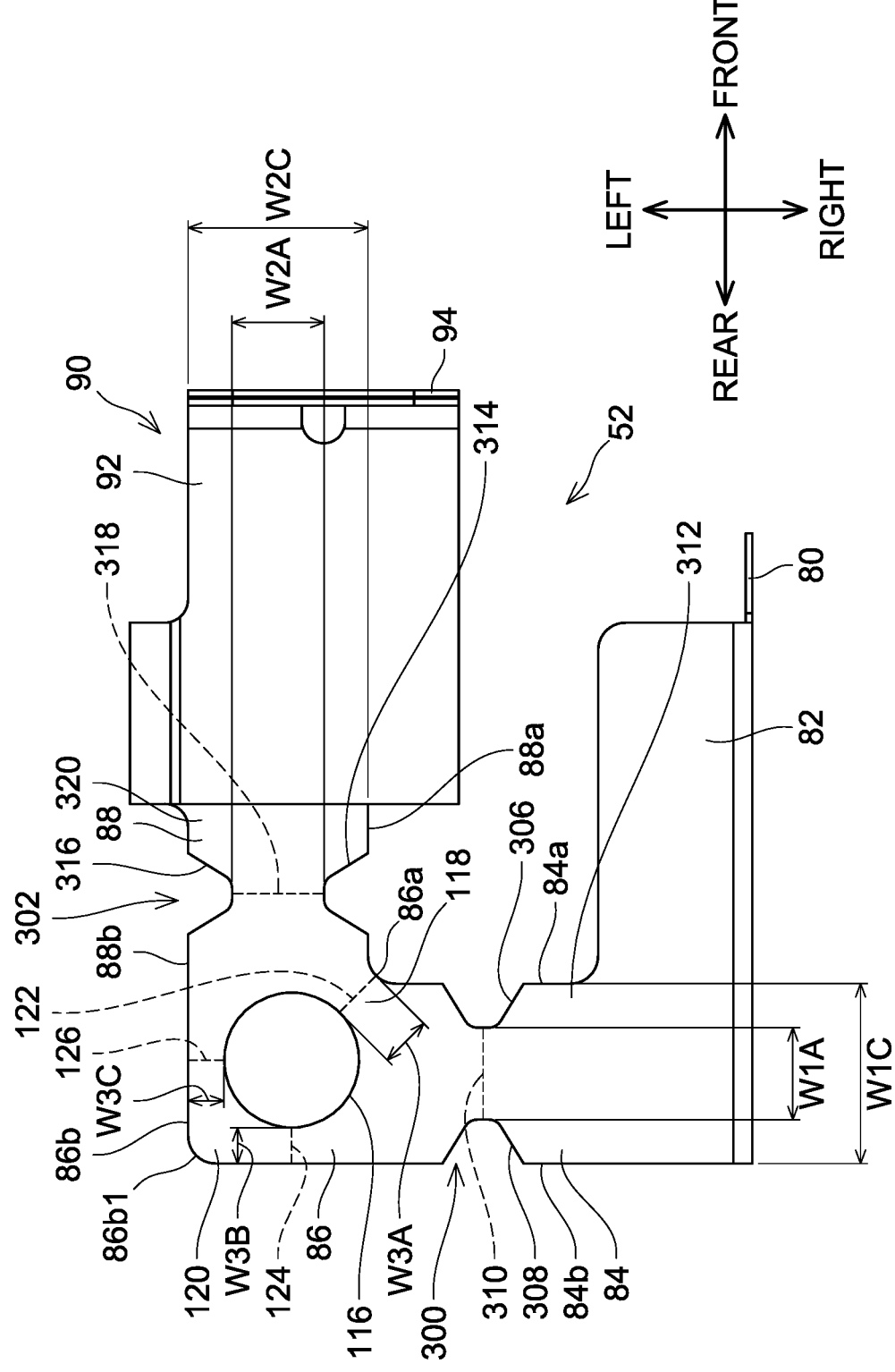
FIG. 9 illustrates a top view of the fusible link plate 52 of a third embodiment.

Referring to FIG. 9, a third embodiment will be described. In the third embodiment, points different from the first embodiment will be described, and the same points as the first embodiment are given the same reference signs and explanations thereof will be omitted. In the third embodiment, a first narrow part 300 is disposed at the first plate part 84 instead of the first thermal diffusion suppressing aperture 100, and a second narrow part 302 is disposed at the second plate part 88 instead of the second thermal diffusion suppressing aperture 108 of the first embodiment. The first narrow part 300 comprises a first front narrow part 306 recessed rearward from the front side surface 84a of the first plate part 84 and a first rear narrow part 308 recessed frontward from the rear side surface 84b of the first plate part 84. The end of the first front narrow part 306 (i.e., a part of the first front narrow part 306 furthest away from the front side surface 84a) is not connected to the end of the first rear narrow part 308 (i.e., a part of the first rear narrow part 308 furthest away from the rear side surface 84b). The width of the first plate part 84 in the front-rear direction is at its minimum at a position between the end of the first front narrow part 306 and the end of the first rear narrow part 308. Therefore, a first thermal diffusion suppressing part 310 is disposed between the end of the first front narrow part 306 and the end of the first rear narrow part 308. With regard to the left-right direction, a part of the first plate part 84 at which the first narrow part 300 is not disposed corresponds to a first thermal diffusion part 312.

The second narrow part 302 comprises a second right narrow part 314 recessed leftward from the right side surface 88a of the second plate part 88 and a second left narrow part 316 recessed rightward from the left side surface 88b of the second plate part 88. The end of the second right narrow part 314 (i.e., a part of the second right narrow part 314 furthest away from the right side surface 88a) is not connected to the end of the second left narrow part 316 (i.e., a part of the second left narrow part 316 furthest away from the left side surface 88b). A width of the second plate part 88 in the left-right direction is at its minimum at a position between the end of the second right narrow part 314 and the end of the second left narrow part 316. Therefore, a second thermal diffusion suppressing part 318 is disposed between the end of the second right narrow part 314 and the end of the second left narrow part 316. With regard to the left-right direction, a part of the second plate part 88 at which the second narrow part 302 is not disposed corresponds to a second thermal diffusion part 320.

A width W1A of the first thermal diffusion suppressing part 310 in the front-rear direction is smaller than a width W1C of the first thermal diffusion part 312 in the front-rear direction. The width W1A of the first thermal diffusion suppressing part 310 in the front-rear direction is larger than the width W3A of the first fusible part 122 and larger than each of the widths W3B, W3C of the second fusible parts 124, 126. A thickness of the first thermal diffusion suppressing part 310 (i.e., width in the up-down direction) is substantially equal to a thickness of the first thermal diffusion part 312 (i.e., width in the up-down direction). The thickness of the first thermal diffusion suppressing part 310 is substantially equal to the thickness of the first fusible part 122 and substantially equal to each of the thicknesses of the second fusible parts 124, 126. Therefore, in a cross section of the first thermal diffusion suppressing part 310 and the first thermal diffusion part 312 along a plane perpendicular to the left-right direction, a cross-sectional area of the first thermal diffusion suppressing part 310 is smaller than a cross-sectional area of the first thermal diffusion part 312. Further, the cross-sectional area of the first thermal diffusion suppressing part 310 is larger than the cross-sectional area of the first fusible part 122 and larger than each of the cross-sectional areas of the second fusible parts 124, 126.

A width W2A of the second thermal diffusion suppressing part 318 in the left-right direction is smaller than a width W2C of the second thermal diffusion part 320 in the left-right direction. The width W2A of the second thermal diffusion suppressing part 318 in the left-right direction is substantially equal to the width W1A of the first thermal diffusion suppressing part 310 in the front-rear direction. The width W2A of the second thermal diffusion suppressing part 318 in the left-right direction is larger than the width W3A of the first fusible part 122 and larger than each of the widths W3B, W3C of the second fusible parts 124, 126. A thickness of the second thermal diffusion suppressing part 318 (i.e., width in the up-down direction) is substantially equal to a thickness of the second thermal diffusion part 320 (i.e., width in the up-down direction). The thickness of the second thermal diffusion suppressing part 318 is substantially equal to the thickness of the first thermal diffusion suppressing part 310. The thickness of the second thermal diffusion suppressing part 318 is substantially equal to the thickness of the first fusible part 122 and substantially equal to each of the thicknesses of the second fusible parts 124, 126. Therefore, in a cross section of the second thermal diffusion suppressing part 318 and the second thermal diffusion part 320 along the plane perpendicular to the front-rear direction, a cross-sectional area of the second thermal diffusion suppressing part 318 is smaller than a cross-sectional area of the second thermal diffusion part 320. The cross-sectional area of the second thermal diffusion suppressing part 318 is substantially equal to the cross-sectional area of the first thermal diffusion suppressing part 310. The cross-sectional area of the second thermal diffusion suppressing part 318 is larger than the cross-sectional area of the first fusible part 122 and larger than each of the cross-sectional areas of the second fusible parts 124, 126. When overcurrent flows though the fusible link plate 52, the first fusible part 122 reaches a highest temperature, thus the fusible link plate 52 melts at the first fusible part 122. When the first fusible part 122 melts, the second fusible parts 124, 126 reach highest temperatures, and the fusible link plate 52 melts at least at one of the second fusible parts 124, 126.

Fourth Embodiment

Figure 10:
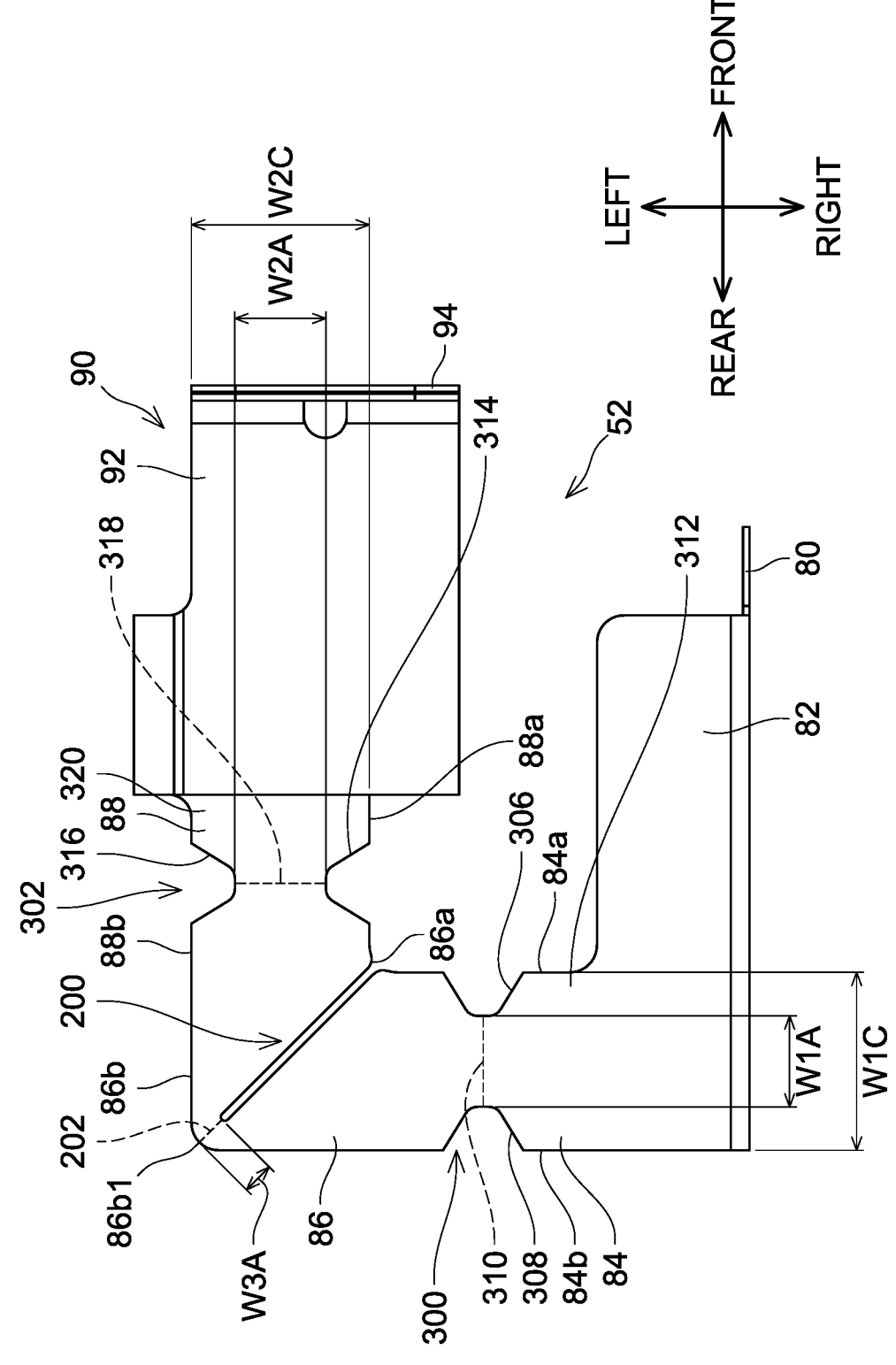
FIG. 10 illustrates a top view of the fusible link plate 52 of a fourth embodiment.

Referring to FIG. 10, a fourth embodiment will be described. In the fourth embodiment, points different from the first embodiment will be described, and the same points as the first embodiment are given the same reference signs and explanations thereof will be omitted. In the fourth embodiment, the cutout 200 is defined in the bent part 86 instead of the fuse aperture 116 of the first embodiment. Further, in the fourth embodiment, the first narrow part 300 is disposed at the first plate part 84 instead of the first thermal diffusion suppressing aperture 100 of the first embodiment, and the second narrow part 302 is disposed at the second plate part 88 instead of the second thermal diffusion suppressing aperture 108 of the first embodiment. Detailed structure of the cutout 200 was explained in detail in the second embodiment, thus the detailed explanations are omitted. Further, detailed structures of the first narrow part 300 and the second narrow parts 302 were explained in detail in the third embodiment, thus the detailed explanations are omitted.

The width W3A of the first fusible part 202 at the bent part 86 is smaller than the width W1A of the first thermal diffusion suppressing part 310 of the first plate part 84 in the front-rear direction and is smaller than the width W2A of the second thermal diffusion suppressing part 318 of the second plate part 88 in the left-right direction. The thickness of the first fusible part 202 is substantially equal to the first thermal diffusion suppressing part 310 and substantially equal to the thickness of the second thermal diffusion suppressing part 318. Therefore, the cross-sectional area of the first fusible part 202 is smaller than the cross-sectional area of the first thermal diffusion suppressing part 310 and smaller than the cross-sectional area of the second thermal diffusion suppressing part 318. When overcurrent flows through the fusible link plate 52, the first fusible part 202 reaches a highest temperature, and thus the fusible link plate 52 melts at the first fusible part 202.

(Variants)

The fusible link plate 52 of an embodiment may electrically connect the positive electrode(s) of the battery cell(s) 20 to the battery-side terminal(s) 26.

In the fusible link plate 52 of an embodiment, when the fusible link plate 52 is viewed in the up-down direction, the first thermal diffusion suppressing aperture 100, the second thermal diffusion suppressing aperture 108, and the fuse aperture 116 may have shapes other than perfect circle shapes, such as oval shapes.

In variants of the second embodiment and fourth embodiment, a second fusible part may be disposed at the bent part 86 in addition to the first fusible part 202. In this case, the cutout 200 may not be connected to the inner side surface 86_a_ nor the outer side surface 86_b_ of the bent part 86. The cutout 200 extends from a position rearward and leftward of the inner side surface 86_a_ of the bent part 86 to a position frontward and rightward of the bending position 86_b_1 of the outer side surface 86_b_. Consequently, the first fusible part 202 is disposed between the end of the cutout 200 on the outer side surface 86_b_ side and the bending position 86_b_1 of the outer side surface 86_b_, and the second fusible part is disposed between the end of the cutout 200 on the inner side surface 86_a_ side and the inner side surface 86_a_. Consequently, strength of the bent part 86 can be enhanced.

What is claimed is:

1. A battery pack for electrical equipment, the battery pack comprising:

a battery cell;

a terminal configured to electrically connect to the electrical equipment; and a fusible link plate electrically connecting the battery cell to the terminal and having a bent shape, wherein the fusible link plate comprises:

a first plate part extending in a first direction;

a second plate part extending in a second direction different from the first direction; and a bent part connecting the first plate part to the second plate part, the first plate part, the second plate part, and the bent part are disposed along a first plane that is along both the first direction and the second direction, the first plate part comprises a first thermal diffusion suppressing aperture penetrating the first plate part in a direction perpendicular to the first plane, the second plate part comprises a second thermal diffusion suppressing aperture penetrating the second plate part in the direction perpendicular to the first plane, first thermal diffusion suppressing parts are each disposed between the first thermal diffusion suppressing aperture and a first side surface of the first plate part and between the first thermal diffusion suppressing aperture and a second side surface of the first plate part, second thermal diffusion suppressing parts are each disposed between the second thermal diffusion suppressing aperture and a first side surface of the second plate part and between the second thermal diffusion suppressing aperture and a second side surface of the second plate part, each of the first thermal diffusion suppressing parts has a first cross-sectional area in a cross section of the first thermal diffusion suppressing part along a plane perpendicular to the first direction, each of the second thermal diffusion suppressing parts has a second cross-sectional area in a cross section of the second thermal diffusion suppressing part along a plane perpendicular to the second direction, the bent part comprises a first fusible part having a third cross-sectional area in a cross section of the bent part along a plane perpendicular to a direction along the first plane, the third cross-sectional area is smaller than the first cross-sectional area and smaller than the second cross-sectional area, and the first cross-sectional area is equal to the second cross-sectional area.

2. The battery pack according to claim 1, wherein the bent part comprises a fuse aperture penetrating the bent part in thea direction perpendicular to the first plane, the bent part comprises:

a first joint part disposed between the fuse aperture and an inner side surface of the bent part; and a second joint part disposed between the fuse aperture and an outer side surface of the bent part, with regard to a path length extending from the first plate part toward the second plate part, a path length of the first joint part is smaller than a path length of the second joint part, and the first fusible part is disposed on the first joint part.

3. The battery pack according to claim 2, wherein the second joint part comprises a second fusible part having a fourth cross-sectional area in the cross section of the second joint part along the plane perpendicular to the direction along the first plane, and the fourth cross-sectional area is smaller than the first cross-sectional area and smaller than the second cross-sectional area.

4. The battery pack according to claim 1, wherein the fusible link plate is electrically connected between a negative electrode of the battery cell and the terminal.

5. A battery pack for electrical equipment, the battery pack comprising:

a battery cell;

a terminal configured to electrically connect to the electrical equipment; and a fusible link plate electrically connecting the battery cell to the terminal and having a bent shape, wherein the fusible link plate comprises:

a first plate part extending in a first direction;

a second plate part extending in a second direction different from the first direction; and a bent part connecting the first plate part to the second plate part, the first plate part, the second plate part, and the bent part are disposed along a first plane that is along both the first direction and the second direction, the first plate part comprises:

a first narrow part recessed from a first side surface of the first plate part; and a second narrow part recessed from a second side surface of the first plate part, a first thermal diffusion suppressing part is disposed between an end of the first narrow part and an end of the second narrow part, the first thermal diffusion suppressing part has a first cross-sectional area in a cross section of the first thermal diffusion suppressing part along a plane perpendicular to the first direction, the second plate part comprises:

a third narrow part recessed from a first side surface of the second plate part; and a fourth narrow part recessed from a second side surface of the second plate part, a second thermal diffusion suppressing part is disposed between an end of the third narrow part and an end of the fourth narrow part, the second thermal diffusion suppressing part has a second cross-sectional area in a cross section of the second thermal diffusion suppressing part along a plane perpendicular to the second direction, the bent part comprises a first fusible part having a third cross-sectional area in a cross section of the bent part along a plane perpendicular to a direction along the first plane, and the third cross-sectional area is smaller than the first cross-sectional area and smaller than the second cross-sectional area, and the first cross-sectional area is equal to the second cross-sectional area.

6. The battery pack according to claim 5, wherein the bent part comprises a fuse aperture penetrating the bent part in the direction perpendicular to the first plane, the bent part comprises:

a first joint part disposed between the fuse aperture and an inner side surface of the bent part; and a second joint part disposed between the fuse aperture and an outer side surface of the bent part, with regard to a path length extending from the first plate part toward the second plate part, a path length of the first joint part is smaller than a path length of the second joint part, and the first fusible part is disposed on the first joint part.

7. The battery pack according to claim 6, wherein the second joint part comprises a second fusible part having a fourth cross-sectional area in the cross section of the second joint part along the plane perpendicular to the direction along the first plane, and the fourth cross-sectional area is smaller than the first cross-sectional area and smaller than the second cross-sectional area.

8. The battery pack according to claim 5, wherein the fusible link plate is electrically connected between a negative electrode of the battery cell and the terminal.

* * * * *